United States Patent [19]
Kashio

[11] 3,924,112

[45] Dec. 2, 1975

[54] ELECTRONIC CALCULATOR

[75] Inventor: Toshio Kashio, Tokyo, Japan

[73] Assignee: Casio Computer Co., Ltd., Higashiyamato, Japan

[22] Filed: July 29, 1974

[21] Appl. No.: 492,857

[30] Foreign Application Priority Data

July 30, 1973 Japan .............................. 48-84967

[52] U.S. Cl. .............. 235/156; 340/324 R; 340/336

[51] Int. Cl.[2] ...................... G06F 3/14; G06K 15/18

[58] Field of Search ........ 58/4 A, 50 R; 235/92 EA, 235/156; 340/336, 324 R

[56] References Cited

UNITED STATES PATENTS 3,848,250 11/1974 Kashio ............................... 340/336

*Primary Examiner*—R. Stephen Dildine, Jr.

*Attorney, Agent, or Firm*—Flynn & Frishauf

[57] ABSTRACT

Digits of numerical information, i.e. the calculation results obtained by an arithmetic operation device, are stored successively into a memory device. At the completion of the arithmetic operation, the most or least significant digit of the numerical information is shifted to the least significant digit position of the memory device. When required, the digits are successively read out from the least significant digit position in response to shift instruction signals supplied to the memory device, and then displayed successively at an indicating device, one at a time. An indication-stop signal is generated upon completion of the read out operation of the numerical information, instructing the indicating device to cease its one-digit indication.

13 Claims, 12 Drawing Figures

FIG. 4-a
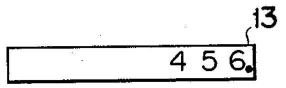
FIG. 4-b
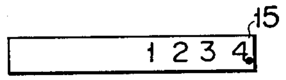
FIG. 4-c
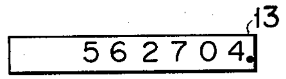
FIG. 4-d
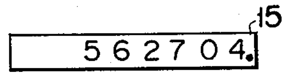
FIG. 4-e
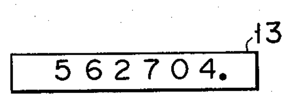
FIG. 4-f
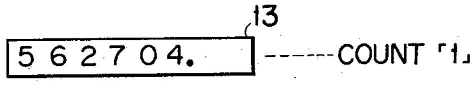
FIG. 4-g
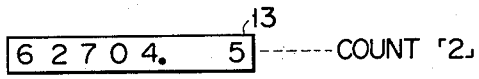
FIG. 4-h, FIG. 4-i
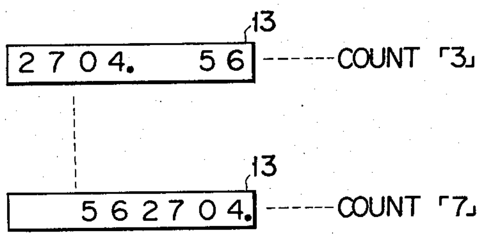

ELECTRONIC CALCULATOR

BACKGROUND OF THE INVENTION

This invention relates to an electronic calculator having a one-digit indicating device.

Generally used is such a desk-top electronic calculator, wherein the input numbers and the numerical value showing the calculation results are displayed at an indicating device capable of indicating multi-digit information at a time. To miniaturize a calculator of this type, the space occupied by the battery, the indicating section, the input keyboard or the arithmetic operation device should be kept minimal. The input keyboard can be redesigned in more compact form, the arithmetic operation device including a memory device can be made smaller in the form of an integrated circuit, and the battery may have a smaller capacity, holding the power consumption of the calculator as little as possible. However, even if these members can be made compact, the indicating section can hardly be miniaturized so long as it is adapted. to display multi-digit information at a time. Accordingly, a multi-digit indicating section has been a block to miniaturization of, in particular, pocket-sized electronic calculators.

The object of this invention is to eliminate the above-noted trouble involved in the miniaturization, and to provide an electronic calculator having a one-digit indicating device which can display numerical information, one digit at a time.

SUMMARY OF THE INVENTION

To achieve the object, the electronic calculator of this invention is provided with a one-digit indicating device which displays successively digits of numerical information one by one. The numerical information, i.e. calculation result obtained from an arithmetic operation device, is so stored in a memory device that its most or least significant digit is shifted to a designated digit position, and read out therefrom. Thus, the digits of the numerical information are cyclically shifted to the designated digit position, successively read out therefrom, and are displayed at the one-digit indicating device.

The signals instructing said digits of the numerical information to be shifted to the designated digit position of the memory device are generated when a logic circuit controls a signal from the arithmetic operation device which indicates the completion of arithmetic operation and another signal which indicates the presence or absence of numerical information to be read out from the memory device. The one-digit indicating device ceases to function when an indication-stop signal is generated by manual operation.

The one-digit indicating device is much smaller than a multi-digit indicating device and consumes far less power. Its power consumption being so small, the electronic calculator requires but a very compact battery. Consequently, the electronic calculator according to this invention can be miniaturized to a good extent.

Brief Description of the Drawings

FIGS. 4a to 4i show how the registers illustrated in FIG. 2 store numerical information.

DESCRIPTION OF THE PREFERRED EMBODIMENT

Figures 1, 3:
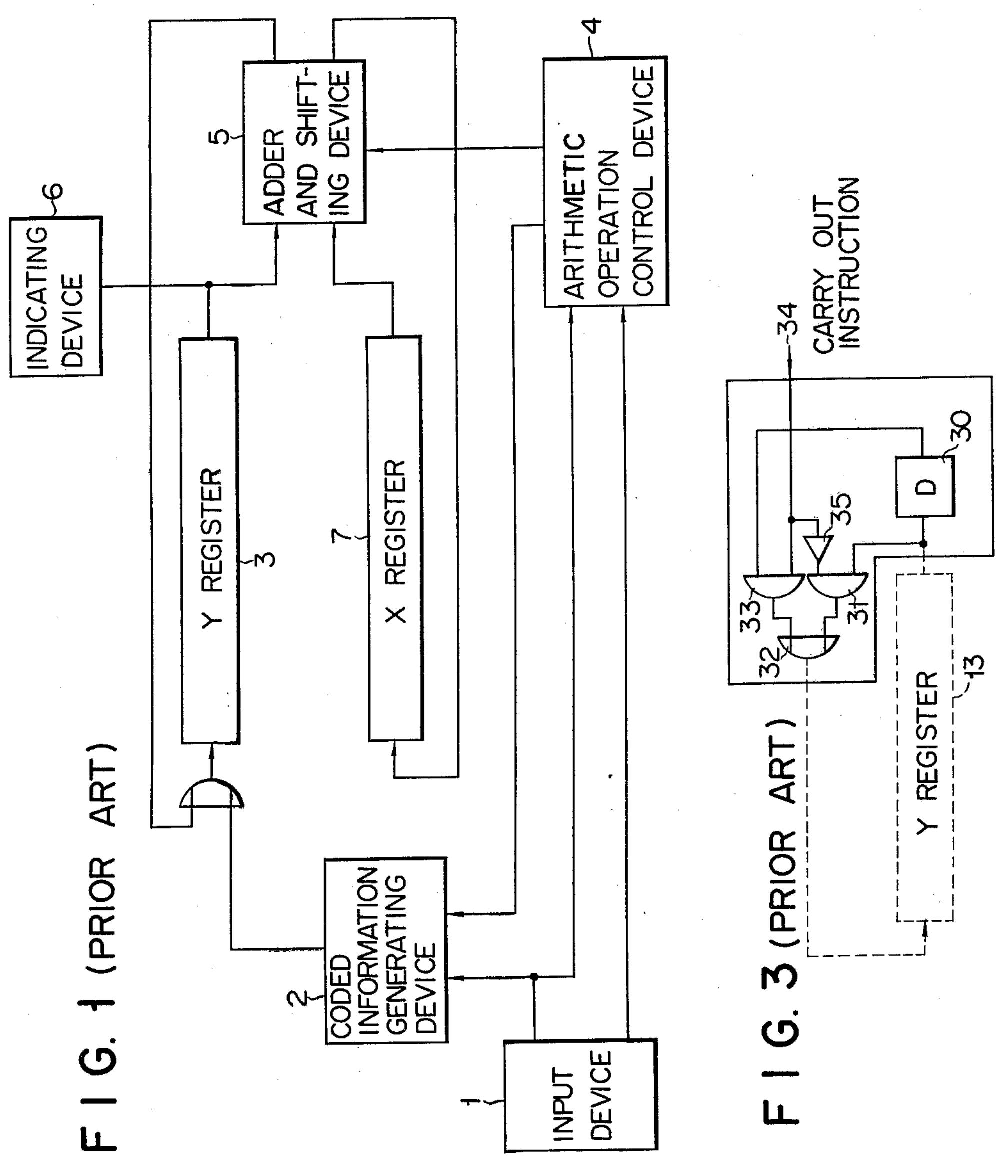
FIG. 1 (PRIOR ART) FIG. 3 (PRIOR ART)
FIG. 1 is a block diagram to be used in explaining the operation of a prior art electronic calculator.
FIG. 3 shows a conventional circuit used to generate signals which instruct the registers shown in FIG. 2 to carry.

One embodiment of this invention will be fully understood with reference to the accompanying drawings. It will be more clearly understood if a prior art electronic calculator as shown in FIG. 1 is explained first.

An input number is fed by key operation at an input device 1 into an arithmetic operation control device 4. Upon receipt of the input number, the arithmetic operation control device 4 supplies to a coded information generating device 2 a signal to control the input timing with which input numbers are to be fed successively after the input number into a Y register 3 each by key operation.

In the meantime, the input number is fed into the coded information generating device 2 by the key operation, coded when said input timing control signal is supplied to the coded information generating device 2, and then stored into the Y register 3 as, for example, an operand. The operand stored in the Y register 3 is circulated in a circulating circuit constituted by the Y register 3 and an adder and shifting device 5 in such a manner that each digit is shifted when the adder and shifting device 5 receives a carry instruction signal which the arithmetic operation control device 4 generates upon feeding the digit after the already stored digit. Thus, the digits of the operand are displayed successively one by one at an indicating device 6.

When a function command signal is fed after the operand into the arithmetic operation control device 4 by key operation at the input device 1, the arithmetic operation control device 4 supplies a signal to the adder and shifting device 5. Then the operand is transferred from the Y register 3 to an X register 7 through the adder and shifting device 5.

Then, an operator is fed into the Y register 3 by the key operation at the input device 1 in the same manner as the operand. This done, the "=" function key is operated to instruct the adder and shifting device 5 to inititate an arithmetic operation on the operand and the operator stored in the X register 7 and the Y register 3, respectively. The results of the arithmetic operation are stored in the Y register 3 and then displayed at the indicating device 6.

An example of such prior art electronic calculator is shown in U.S. Pat. No. 3,548,179 (Kimura et al) patented Dec. 15, 1970. The indicating device 6 used in the above-mentioned prior art calculator is to indicate multi-digit information, i.e. the calculation results, and is provided with a plurality of indicating elements. It is therefore made massive and inevitably occupies a considerable space, making it difficult to achieve miniaturization of electronic calculators.

Accordingly, the present invention aims at a miniaturization of electronic calculators, modifying the circuitry so that such indicating device can display multi-digit information one digit after another.

Figure 2:
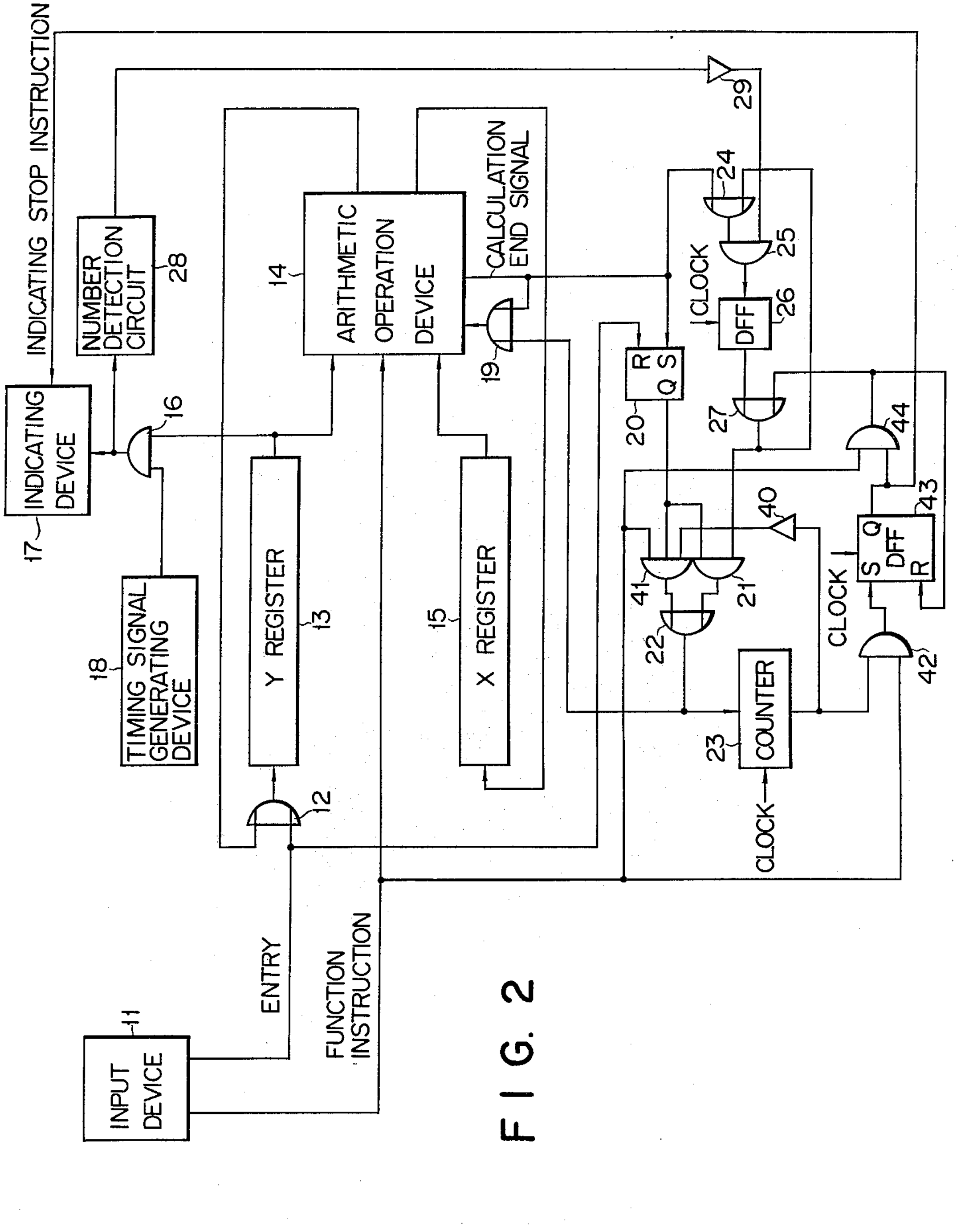
FIG. 2 is a block diagram of one embodiment of the present invention.

In the embodiment of this invention, as shown in FIG. 2, an input number is stored as, for example, an operand into a Y register 13 through an OR circuit 12 by key operation at an input device 11. The operand is further fed into an arithmetic operation device 14 and stored again in the Y register 13 through the OR circuit 12. The OR circuit 12, the Y register 13 and the arithmetic operation device 14 form a circulating memory circuit. When supplied with a function signal from the input device 11, the arithmetic operation device 14 transfers the operand from the Y register 13 to an X register 15. Then, the arithmetic operation device 14 begins an arithmetic operation on the operand and the operator fed after the operand from the input device 11 to the Y register 13. The result of the arithmetic operation is thus obtained and transferred to the Y register 13. The arithmetic operation device 14 is therefore provided with such devices as the adder and shifting device 5 and the arithmetic operation control device 14 both shonw in FIG. 1.

The output terminal of the Y register 13 is connected through an AND circuit 16 to an indicating device 17. One of the gates of the AND circuit 16 is connected to a timing signal generating device 18 which is adapted to generate with synchronism in the shifting cycle of the Y register 13 a signal designating the least significant digit position of the Y register 13. Upon completion of an arithmetic operation, the arithmetic operation device 14 generates a signal indicating the completion of the arithmetic operation and supplies a carry instructing signal to the Y register 13 through an OR circuit 19. The carry operation in the Y register 13 is actuated by such a carry circuit as shown in FIG. 3 and as constituted by the some portion of the Y register 13 and the arithmetic operation device 14. The cyclic carry operation of the Y register 13 can be effected by a circulating circuit formed by connecting the output terminal of the Y register 13, one gate of an AND circuit 31, an OR circuit 32, and the input terminal of the Y register 13. The carry circuit includes a one-bit delay circuit 30 with its input and output terminals connected respectively to the output terminal of the Y register 13 and to the other gate of the OR circuit 32 through an AND circuit 33. The carry circuit has its input terminal 34 connected to the other gate of the AND circuit 31 through an inverter 35 and connected in parallel to the other gate of the AND circuit 33. Thus, upon receipt of a carry instruction signal the inverter 35 prohibits the AND circuit 31 to receive any inputs. Then, the cyclic carry operation of the Y register 13 is carried out through the delay circuit 30, the AND circuit 33 and the OR circuit 32. Namely, the normal shifting of the Y register 13 is switched to, so to speak, an outer cyclic shifting. As a result, the carry of the input information is effected within the Y register 13.

The embodiment as shown in FIG. 2 will now be discussed again. The operation-ended signal from the arithmetic operation device 14 is supplied to the set terminal of a flip-flop circuit 20, the output terminal of which is connected through an AND circuit 21 and an OR circuit 22 to a counter 23 adapted to count how many carry operations are cyclically effected in the Y register 13. The output terminal of the OR circuit 22 is connected to one gate of the OR circuit 19 and then to the arithmetic operation device 14. In response to the output of the OR circuit 22, the arithmetic operation device 14 effects the carry shifting of the Y register 13.

Meanwhile, the operation-ended signal is fed also to an OR circuit 24 and supplied further to one gate of the AND circuit 21 through an AND circuit 25, a delayed flip-flop circuit 26 and an OR circuit 27. Consequently, the AND circuit 21, even if supplied with said operation-ended signal, does not produce and supply any output to the OR circuit 19 and the counter 23 so long as it receives no output from the OR circuit 27. The numerical information, i.e. the calculation result obtained from the Y register 13, is transferred through the AND circuit 16 to a number detection circuit 28, which detects the presence or absence of a digit of numerical information at the least significant digit position of the Y register 13. The number detection circuit 28, upon detecting a digit to exist at the least significant digit position, produces and supplies an output to the other gate of the AND circuit 25 through an inverter 29. Accordingly, by the time when the operation-ended signal reaches one gate of the AND circuit 25 through the OR circuit 24, the input information has already been shifted for one digit in the Y register 13 by the operationended signal. The number detection circuit 28 detects the absence of a digit at the least significant digit position of the Y register 13. Then, the inverter 29 receives no input, and the AND circuit 25 produces an output.

The output terminal of the OR circuit 27 is connected to the gate terminal of the OR circuit 24. Accordingly, even if the operation-ended signal is no longer supplied to the AND circuit 25, the gate of the AND circuit 25 is held open only if a digit is not detected, by the number detection circuit 28, to be present at least significant digit position of the Y register 13. Consequently, the AND circuit 25 produces outputs, i.e. carry instruction signals, which are supplied to the arithmetic operation device 14 through, as aforementioned, the delayed flip-flop circuit 26, the OR circuit 27, the AND circuit 21, the OR circuit 22 and the OR circuit 19. In response to the carry instruction signals, the arithmetic operation device 14 effects the cyclic shifting of Y register 13 until the number detection circuit 28 detects a digit of numerical information to be present at the least significant digit position.

The counter 23 may fully function if provided with a counting capacity good enough to count up a number of carry operations which define a cycle of the shifting at the Y register 13. That is, if the Y register 13 has a memory capacity of eight digits, the counter 23 may be an eight-scale counter. In this embodiment, since the first carry operation is made through the OR circuit 19 upon generation of an operation-ended signal and need not be counted by the counter 23, the counter 23 is of only seven-scale if the Y register 13 has a memory capacity of eight digits.

The output of the counter 23 is fed to one gate of an AND circuit 41 through an inverter 40. The other gate of the AND circuit 41 receives the output of the flip-flop circuit 20 and a function signal, in particular, = code signal. Since an output is obtained by the flip-flop circuit 20 reset by the operation-ended signal and is retained till the next input number is fed into the Y register 13, the AND circuit 41 generates an output at every generation of the = code signal until the counter 23 finishes counting seven shifting operations, that is, until one cycle of shifting operation of the Y register 13 is completed. In this manner, after an arithmetic operation is finished to obtain the results, a = code signal is generated by key operation at the input device 11. Every time the AND circuit 41 receives a = code signal, a carry signal is supplied to the arithmetic operation device 14 through the OR circuit 19. During the cyclic shifting of the Y register 13, the multi-digit numerical information is read out digit by digit from the least significant digit position of the Y register 13 and fed to a one-digit indicating device 17 under timing-control of the output from the timing signal generating device 18. Thus, the multi-digit numerical information is displayed at the one-digit indicating device 17, one digit at a time.

When the counter 23 finishes counting seven carry operations effected by = code signals, it produces an output, which is supplied to the AND cirucit 41 through the inverter 40, thus closing the gate of the AND circuit 41. By this time the number detection device 28 has detected the multi-digit numerical information, i.e. the results of the arithmetic operation. As a result, the inverter 29 produces no output and brings the AND circuit 25 in inoperative condition. Consequently, the AND circuit 21 does not produce any output and no carry instruction signal is obtained and no input is supplied to the OR circuit 19 and to the counter 23. When the counter 23 produces an output, the gates of an AND circuit 42 are opened. The AND circuit 42 then produces an output, which sets a flip-flop circuit 43. The flip-flop circuit 43 emits an output to the indicating device 17. Upon receipt of the output thus emitted, the indicating device 17 stops displaying the numerical information.

The output of the flip-flop circuit 43 is supplied simultaneously to the gate of an AND circuit 44. The output of the AND circuit 44 is fed to the reset terminal of the flip-flop circuit 43 and to one gate of the OR circuit 27. The other gate of the AND circuit 44 opens when it receives a = code signal produced by the key operation at the input device 11. The output of the AND circuit 44 is supplied to the reset terminal of the flip-flop circuit 43 and to one gate of the OR circuit 27 in order to put the indicating device 17 in operative condition again and to make it possible that the AND circuit 21 opens again upon generation of an operation-ended signal and thus serves to effect the one-digit indication.

How the digit indication is effected will now be explained in detail, showing an example.

If the product of 1234 × 456 is to be obtained, digits 1, 2 3 and 4 are stored into the Y register 13 by the key operation at the input device 11 through the OR circuit 12. Then, function code signal $x$ is fed to the arithmetic operation device 14, so that digits 1, 2, 3 and 4 are shifted transferred to the X register 15. This done, digits 4, 5 and 6 of the multiplier are stored in the emptied Y register 13. The information storage condition at this stage is shown in FIGS. 4*a* and 4*b*. Under this storage condition, = code signal is supplied to the arithmetic operation device 14. Upon receipt of code signal, the arithmetic operation device 14 starts the multiplication: 1234 × 456. The result of the multiplication, i.e. 562,704 is stored in both registers as illustrated in FIGS. 4*c* and 4*d*. At the same time, an operation-ended signal is generated by the arithmetic operation device 14 and fed to the Y register 13 through the OR circuit 19 as a carry instruction signal, thereby to automatically carry the information in the Y register 13 for one digit position. The information storage condition in the Y register 13 at this stage is as shown in FIG. 4*e*. Such a carry circuit as shown in FIG. 3 is employed to receive the carry instruction signal and effect shift operation.

In the information storage condition shown in FIG. 4*e*, no digit exists at the least significant digit position of the Y register 13. Accordingly, the number detection circuit 28 generates no output and the inverter 29 produces an output, which is supplied to one gate of the AND circuit 25. The AND circuit 25 then generates an output since its other gate is supplied with the operation-ended signal from the arithmetic operation device 14. The output thus produced is fed to one gate of the AND circuit 21 through the flip-flop circuit 26 and the OR circuit 27. Supplied at its other gate with the output which the flip-flop circuit 20 produces upon receipt of the operation-ended signal, the AND circuit 21 generates an output, which is supplied as a carry instruction signal to the Y register 13 through the OR circuit 22 and the OR circuit 19. The Y register 13, when supplied with the carry instruction signal from the OR circuit 22, again has the input information carried for one digit position as shown in FIG. 4*f*.

This carry operation is counted by the counter 23 and registered as counter value 1. Meanwhile, since the output of the delayed flip-flop circuit 26 is fed back to the OR circuit 24, a new carry instruction signal is generated by the AND circuit 25, delayed for one-word time by the delayed flip-flop circuit 26, and then fed to the Y register 13 through the OR circuit 27, the AND circuit 21, the OR circuit 22, the OR circuit 19 and the arithmetic operation device 14, thereby to effect another carry operation of the Y register 13 as shown in FIG. 4*g*. Then, the counter 23 counts the second shift operation and registers the count value 2.

Since the output of the OR circuit 27 is fed back to the OR circuit 24, the inverter 29 keeps on supplying outputs to the one gate of the AND circuit 25 as long as no digit is detected, as the case may be, to be presetn at the least significant digit position of the Y register 13. During this output supply of the inverter 29, the outputs of OR circuit 27 are fed through the OR circuit 24 to the AND circuit 25 as gate inputs. Upon receipt of the output of the OR circuit 27, the OR circuit 22 generates an output, which serves as a carry instruction signal to the Y register 13 and makes the counter 23 count one carry operation. This is repeatedly effected until a digit is delayed for one word time, shifted to the least significant digit position of the Y register 13 and is detected so that the AND circuit 25 is prohibited by the inverter 29 to receive gate inputs.

In this embodiment, when the counter 23 has the count value of, for example, 2 as shown in FIG. 4*g*, the most significant digit of the product of the multiplication, i.e. 5 is shifted to the least significant digit position of the Y register 13. The number detecting device 28 detects 5 and prohibits the inverter 29 to produce outputs, thereby bringing to a halt the shifting operation at the Y register 13. In synchronism with the detection of 5 at the least significant digit position, the timing signal generating device 18 produces a timing instruction signal, which opens the AND circuit 16 to actuate the indicating device 17. Upon receipt of the timing instruction signal, the indicating device 17 displays 5. Thereafter, another = code signal is fed into one gate of the AND circuit 41 by key operation at the input device 11. At this stage, the other gate of the AND circuit 41 is supplied still with the output of the flip-flop circuit 20 and the output of the inverter 40 since the counter 23 has yet to have a count value of 7. As a result, an output is generated by the AND circuit 41 and fed to the Y register 13 through the OR circuit 22 as a carry instruction signal, and makes the counter 23 count another shifting operation. Then, 6, the second digit of the results of the arithmetic operation, is shifted to the least significant digit position as shown in FIG. 4*h*. Similarly, each of the other digits of the results of the multiplication is successively shifted to the least significant digit position and displayed by the indicating device when a key operation is made at the input device 11 to generate a = code signal.

The counter 23 keeps counting carry operations until it has the count value of 7, when it produces and supplies an output to the inverter 29. Consequently, the inverter 40 no longer generates outputs, and no carry instruction signal is generated any more. After the display of the results of the arithmetic operation is completed at the indicating device 17, the AND circuit 42 receives a = code signal and an output of the counter 23 thereby to produce an output, which sets the flip-flop circuit 43. Then, the flip-flop circuit 43 generates an indication-stop signal and supplies the same to the indicating device 17.

In order to display the results of the multiplication for the second time, another = code signal is generated by key operation at the input device 11. The =code signal is then fed to the AND circuit 44 together with the output of the flip-flop circuit 43. Upon receipt of the output and the = code signal, the AND circuit 44 produces an output, which is supplied to one gate of the AND circuit 21 through the OR circuit 27. As the result of this, another cycle of shifting is initiated in the same manner as when an operation-ended signal is generated, and carried out until the least significant digit of the results of the arithmetic operation comes around to the least significant digit position of the Y register 13.

According to the embodiment of FIG. 2, numerical information is read out one digit after another from the least significant digit position of the Y register 13 and displayed one digit after another at the indicating device 17 every time the timing signal generating device 18 produces a timing signal. Instead of this, the numerical information may be read out, one digit after another from the respective digit positions with different timings and displayed at the indicating device 17 one digit after another.

In the embodiment, a one-digit carry operation is made to display the results of arithmetic operation every time a = code signal is generated by key operation at the input device 11. Instead of this, carry operation can be made after the completion of the arithmetic operation, using such a timer as serves to supply a predetermined number of carry instruction signals to one gate of the AND circuit 41. Further, the carry-stop signal, which is generated when the number detecting device 28 detects the least significant digit, may be detected by a detecting device and reported by a suitable device. If this measure is taken, the termination of the arithmetic operation can be more unfailingly noticed.

Further, the arithmetic operation device 14 is provided with such a circuit (e.g. conventional flip-flop circuit) as distinguishes a = function signal from a = code signal as a carry instruction signal. The circuit is provided so that a key need not be provided to generate carry instruction signals. If the number of input keys need not be reduced, another key to feed only carry instruction signals may be added to the input keyboard.

The one-digit indicating device 17 may be replaced by a one-digit indicating device which displays the digital order of the digit and the number of digits forming the numerical information.

Like the results of the arithmetic operation, input numbers such as an operand and an operator can also be displayed at the indicating device, one digit after another in the consecutive order.

What is claimed is:

1. An electronic calculator having input means for supplying numerical input information and function instruction, arithmetic operation means for effecting an arithmetic operation on the numerical input information in response to the function instruction, and register means coupled between said input means and said arithmetic operation means and adapted to store the numerical input information and the results of the arithmetic operation, the electronic calculator further including:

indicating means coupled to said register means and adapted to display one of digits of the numerical input information stored in said register means;

first control means coupled to said register means for feeding to said indicating means one of the numerical input information stored in said register means;

second control means coupled to said register means for starting the shift of the numerical input information in said register means when said arithmetic operation means finishes an arithmetic operation, for detecting the arrival of a terminal digit of the numerical input information at a feed-out position of said register means from which the digits of the numerical input information are to be fed successively to said indicating means, and for stopping the shift of the numerical input information when said detection is made;

third control means coupled to said register means for reading out the numerical input information digit by digit from said register means after the terminal digit of the numerical input information reaches said feed-out position of the register means and for shifting succeeding numerical input information digit by digit to said feed-out position of said register means; and detecting means for detecting the display of the terminal significant digit of said numerical information, to thereby ascertain that all the digits thereof have been displayed.

2. An electronic calculator according to claim 1 wherein said register means comprises a register (13) to store numerical input information from said input means and the results of arithmetic operation from said arithmetic operation means.

3. An electronic calculator according to claim 1 wherein said register means comprises a first register (13) to store the numerical input information from said input means; and a second register (15) to store the results of arithmetic operation from said arithmetic operation means.

4. An electronic calculator according to claim 1 wherein said first control means comprises a timing pulse generating means (18) to generate a timing pulse cyclically in synchronism with the read out timing of one digit of the numerical input information from said register means; and gate means (16) coupled to receive as gate inputs an output pulse from said timing pulse generating means (18) and an output signal from said register means (13) and then to supply to said indicating means one digit of the numerical input information from said register means (13).

5. An electronic calculator according to claim 1 wherein said second control means includes means for detecting the arrival of the most significant digit of the numerical input information stored in said register means at said feed-out position of the register means from which the digits of the numerical input information are to be fed successively to said indicating means, and for then stopping the shifting of said numerical input information.

6. An electronic calculator according to claim 1 wherein said second control means includes means for detecting the arrival of the least significant digit of the numerical input information stored in said register means at said feed-out position of the register means from which the digits of the numerical input information are to be fed successively to said indicating means, and for then stopping the shifting of said numerical input information.

7. An electronic calculator according to claim 1 wherein said second control means comprises a number detection means (28) to detect that a terminal digit of the numerical input information is fed to said indicating means by said first control means from said register means; and inverter means (29) connected to the output terminal of said number detection means (28) and coupled to intercept a shift instruction signal to said arithmetic operation means when said number detection means (28) effects said detection, thereby intercepting a shift instruction signal with respect to the numerical input information stored in said register means.

8. An electronic calculator according to claim 7 wherein the numerical information to be fed from said register means to said indicating means is a numerical value indicating the results of an arithmetic operation.

9. An electronic calculator according to claim 1 wherein said third control means comprises memory means (20) for storing an end-signal denoting completion of the arithmetic operation; and a logic circuit coupled to said memory means (20) to supply an output signal indicating the storing of the end-signal in said memory means (20), said output signal being fed to said arithmetic operation means as a shift instruction signal.

10. An electronic calculator according to claim 9 wherein said logic circuit includes a gate control input responsive to a function instruction (16) from said input means (11) for controlling the output of said logic circuit.

11. An electronic calculator according to claim 9, comprising a timer, and wherein said logic circuit includes a gate input responsive to a pulse signal from said timer for controlling the output of said logic circuit.

12. An electronic calculator according to claim 1 wherein said detecting means includes counter means (23) coupled to said second and third control means for counting the output signals from said second and third control means which are supplied to said arithmetic operation means as control signals, and for producing a carry signal to indicate the display of the final significant digit, thereby ascertaining that all the digits of the numerical input information have been displayed.

13. An electronic calculator according to claim 1 wherein said indicating means further includes a special display pattern which indicates the completion of the display of all the digits constituting the numerical input information from said register means.

* * * * *